(12) United States Patent
Ingram, Sr.

(10) Patent No.: US 8,853,541 B2
(45) Date of Patent: Oct. 7, 2014

(54) OVERHEAD POWER CORD HOLDER

(76) Inventor: Glen Maurice Ingram, Sr., St. Paul, MN (US)

( * ) Notice: Subject to any disclaimer, the term of this patent is extended or adjusted under 35 U.S.C. 154(b) by 80 days.

(21) Appl. No.: 13/334,698

(22) Filed: Dec. 22, 2011

(65) Prior Publication Data
US 2012/0168202 A1     Jul. 5, 2012

Related U.S. Application Data

(60) Provisional application No. 61/460,584, filed on Jan. 5, 2011.

(51) Int. Cl.
    *H01B 9/00*     (2006.01)
    *H02G 3/30*     (2006.01)

(52) U.S. Cl.
    CPC ..................... *H02G 3/30* (2013.01)
    USPC ........... 174/135; 439/501; 242/370; 191/128

(58) Field of Classification Search
    CPC ......... H02G 11/00; H02G 3/26; H02G 11/02; H02G 3/30
    USPC ........... 174/135; 439/501; 191/128; 180/2.1; 242/370

See application file for complete search history.

(56) References Cited

U.S. PATENT DOCUMENTS

| | | | | |
|---|---|---|---|---|
| 5,317,493 A | * | 5/1994 | Muller et al. | 362/407 |
| 2003/0136885 A1 | * | 7/2003 | Malizia | 248/125.8 |
| 2008/0235899 A1 | * | 10/2008 | Haan | 15/320 |

* cited by examiner

*Primary Examiner* — Dhirubhai R Patel
(74) *Attorney, Agent, or Firm* — Merchant & Gould P.C.

(57) ABSTRACT

An overhead electrical cord holder allows the user to safely operate a household appliance without tripping with the power cord. The power cord holder includes a hollow outer tube and an inner tube slide able inside the hollow outer tube. The inner tube includes an end protruding from the bottom end of the hollow outer tube. A rotatable mounting block is attached to the protruding end of the inner tube. The hooks are secured to the rotatable mounting block. The rotatable mounting block is rotatable with the inner tube.

16 Claims, 2 Drawing Sheets

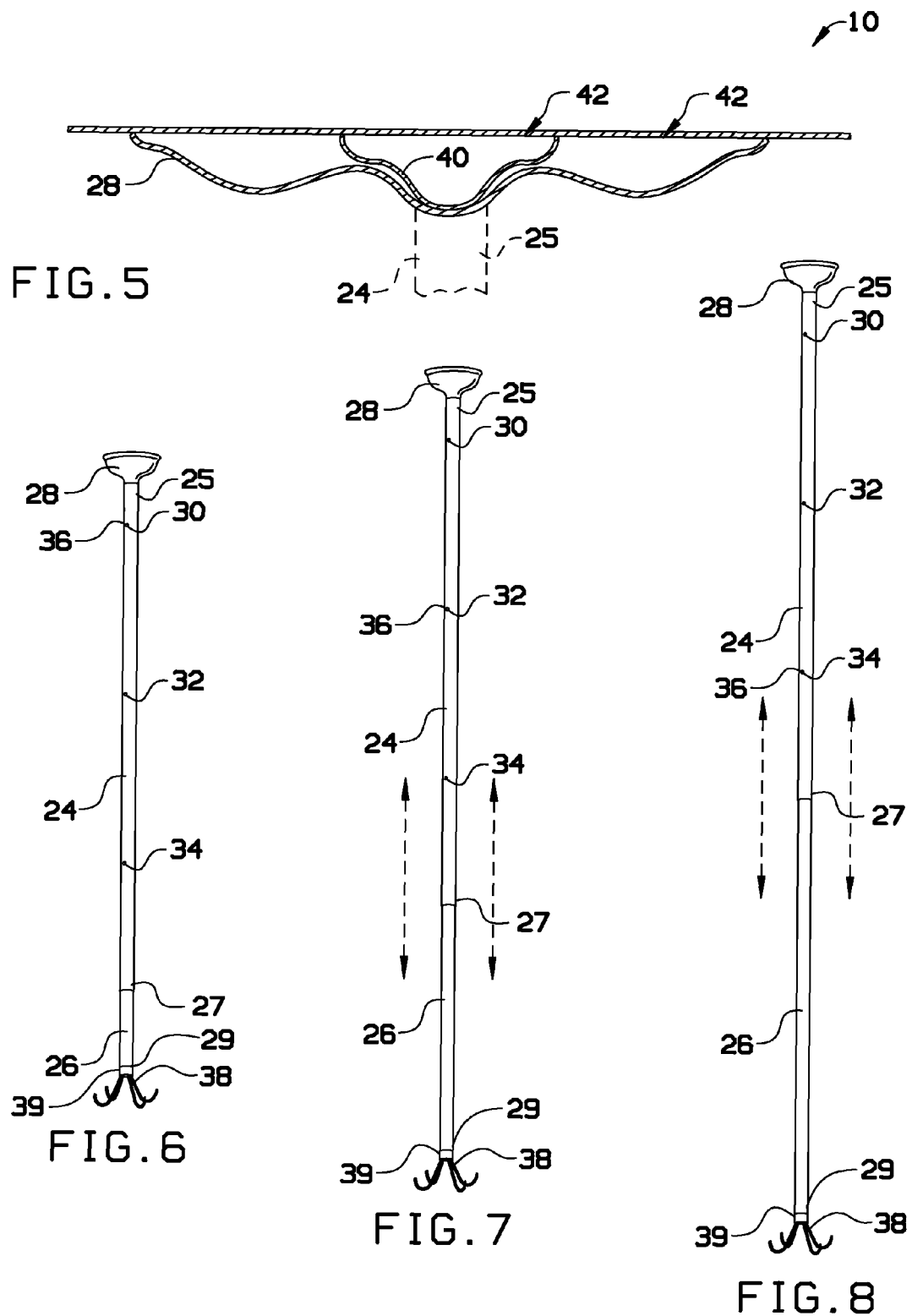

OVERHEAD POWER CORD HOLDER

CROSS-REFERENCE TO RELATED APPLICATIONS

This application claims the benefit of priority to U.S. Provisional Application No. 61/460,584 filed Jan. 5, 2011, the contents of which are incorporated herein by reference.

BACKGROUND OF THE INVENTION

The present invention generally relates to a power cord holder. More particularly, the present invention relates to an overhead power cord holder.

Household appliances are commonly equipped with an elongated power cord. Power cords have sufficient length to allow a user to operate the household appliance. Unfortunately, because of the length of the power cords, users are constantly tripping over the power cords.

As can be seen, there is a need for a device that allows the user to safely operate a household appliance without tripping with the power cord.

SUMMARY OF THE INVENTION

In one aspect of the present invention, a power cord holder includes a hollow outer tube including a top end and a bottom end; an inner tube slide able inside the hollow outer tube, the inner tube includes an end protruding from the bottom end of the hollow outer tube; a rotatable mounting block attached to the protruding end of the inner tube; hooks secured to the rotatable mounting block, the rotatable mounting block is rotatable with the inner tube.

These and other features, aspects and advantages of the present invention will become better understood with reference to the following drawings, description and claims.

BRIEF DESCRIPTION OF THE DRAWINGS

FIG. 5 is a cross sectional view of the power cord holder taken along line 5-5 in FIG. 1 showing details of a mounting device;

FIG. 6 is a perspective front view of the power cord holder of FIG. 1 showing the power cord holder in a retracted configuration;

FIG. 7 is a perspective front view of the power cord holder of FIG. 1 showing the power cord holder in a semi-open configuration; and FIG. 8 is a perspective front view of the power cord holder of FIG. 1 showing the power cord holder in an open configuration.

DETAILED DESCRIPTION OF THE INVENTION

Figure 1:
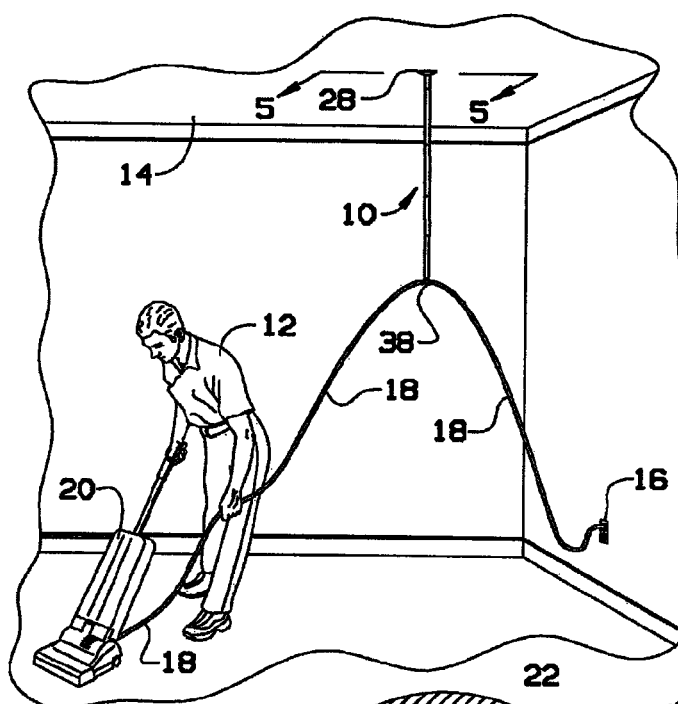
FIG. 1 is a perspective front view of a power cord holder according to an exemplary embodiment of the present invention showing the power cord holder in use.
Figure 2:
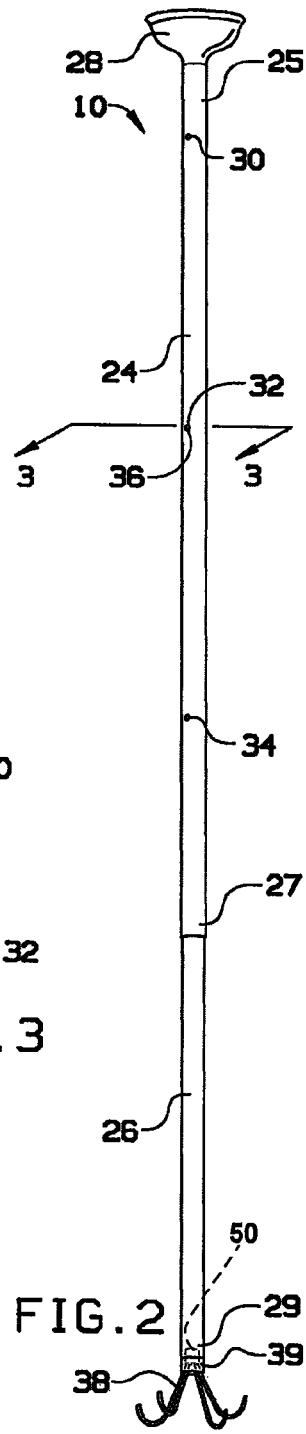
FIG. 2 is a perspective front view of the power cord holder of FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide an overhead electrical cord holder that allows the user to safely operate a household appliance without tripping with the power cord.

FIGS. 1-2 and 6-8 show a power cord holder 10 according to an exemplary embodiment of the present invention. The power cord holder 10 may allow a user 12 to safely operate a household appliance 20 without tripping with a power cord 18 plugged into a power outlet 16. The power cord holder 10 may be an overhead holder that is secure above the head of the user 12, for example, a ceiling 14. The household appliance 20 may be a commercially available electrical powered appliance, for example, a vacuum cleaner, carpet cleaner, steamer, or electrical tools.

The power cord holder 10 may include a hollow outer tube 24 and an inner tube 26 telescoping from the hollow outer tube 24. The outer tube 24 and the inner tube 26 may be made of a sturdy material, for example, plastic, metal, composite, wood, or resin.

The outer tube 24 may include a top end 25 and a bottom end 27. The diameter and length of the outer tube 24 may depend on the distance between the ceiling 14 and the floor 22. The outer tube 24 may have a length, for example, of approximately between 1 and 4 feet. In some embodiments, the outer tube 24 may be 3 feet long.

Pin holes 30, 32, 34 may be located through the length of the outer tube 24. The pin hole 30 may be placed at, for example, 8 inches from the top end 25. The pin hole 32 may be placed at, for example, 9 inches from the top end 25. The pin hole 34 may be placed at, for example, 10 inches from the top end 25.

The inner tube 26 may have a free end 29 protruding from the bottom end 27 of the hollow outer tube 24. The diameter and length of the inner tube 26 may depend on the size and length of the outer tube 24. The inner tube 26 may have a length, for example, of approximately between 1 and 3 feet. In some embodiments, the inner tube 26 may be 2 feet long.

At least one locking pin 36 may be located on the inner tube 26. The locking pin 36 may be, for example, a commercially available spring-loaded locking pin.

A rotatable mounting block 39 may be attached to the free end 29 of the inner tube 26. The rotatable mounting block 39 may rotate with regards to the inner tube 26 as the user 12 moves. A bearing system 50 may be internally secured to the rotatable mounting block 39. The bearing system 50 may spin the rotatable mounting black 39 with the movement of the power cord 18.

Hooks 38 may be secured to the bearing system 50 of the rotatable mounting block 39. The hooks 38 may retain the power cord 18 on the power cord holder 10. The hooks 38 may spins with the movement of the rotatable mounting block 39. The size of the hooks 38 may depend on the size of the inner tube 26. The hooks 38 may be made, for example, of metal or plastic. The hooks 38 may have an S-shape, U-shape, V-shape, or J-shape.

Figure 3:
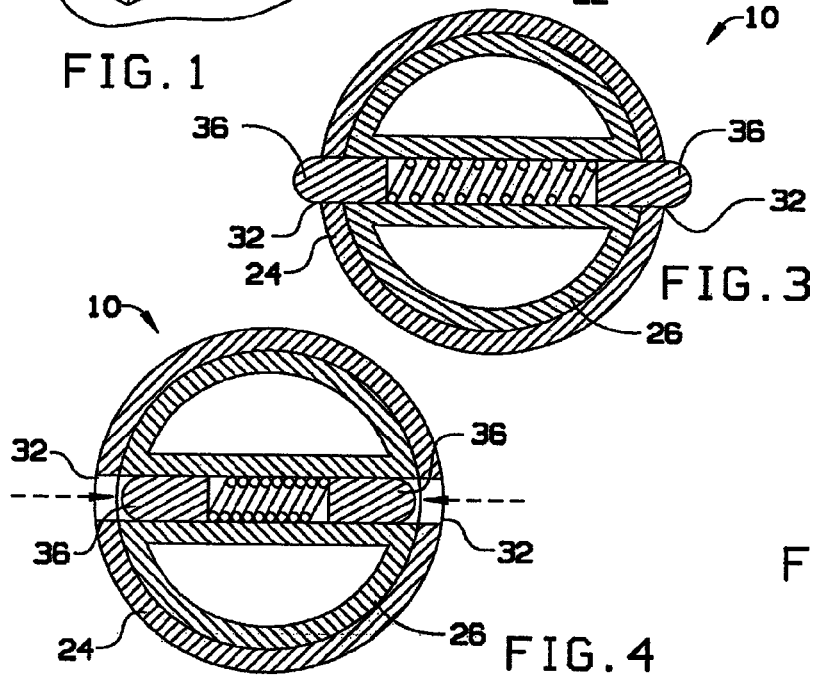
FIG. 3 is a cross sectional view of the power cord holder taken along line 3-3 in FIG. 2 showing a locking pin in a lock position.
Figure 4:
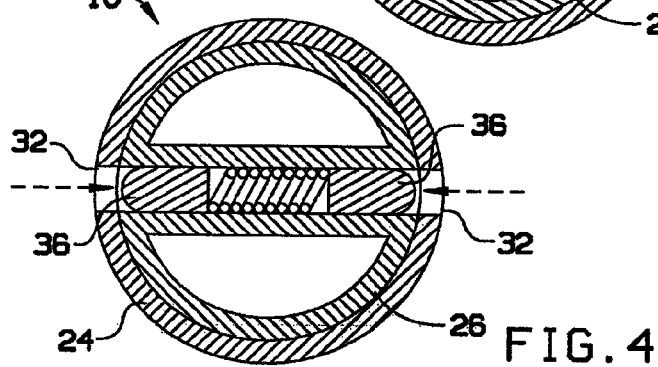
FIG. 4 is a view showing the locking pin of FIG. 3 in an unlocked position.

As can be seen from FIGS. 3-4, the locking pin 36 may engage or disengage with any of the pin holes 30, 32, 34 of the hollow outer tube 24 to adjust the length of the power cord holder 10. The user 12 may engage the locking pin 36 in the pin holes 30, 32, 34 depending on the height of the ceiling 14.

The user 12 may hang the power cord 18, for example, at approximately five feet from the floor 22.

A suction cup 28 may be secured to the top end 25 of the hollow outer tube 24. The suction cup 28 may secure the power cord holder 10 to the ceiling 14. The suction cup 28 may use negative fluid pressure of air to adhere to the ceiling 14. The suction cup 28 may be easily mounted and removed from one location of the ceiling 14 to another location while the user 12 is using the household appliance and needs to move. The suction cup 28 may have a diameter of approximately between 2 and 4 inches.

As can be seen from FIG. 5, the suction cup 28 may include a smaller suction cup 40 integrally molded to the interior of the suction cup 28. The suction cup 40 may provide the suction cup 28 with an additional seal to conform to and accommodate irregularities on a surface 42 of the ceiling 14. The additional sealing may be produced by pressing the small suction cup 40 against the surface 42.

The user may secure the power cord holder 10 to the ceiling 14 by using the suction cup 28. Then, the user 12 may adjust the height of the power cord holder 10 by engaging the locking pin 36 of the inner tube 26 in any of the pin holes 30, 32, 34 of the hollow outer tube 24, depending on the height of the ceiling 14. The user 12 may hook the power cord 18 into one of the hooks 38 of the power cord holder 10. The user 12 may then start the operation of the vacuum.

The power cord holder 10 may be used on any field that may require keeping the power cords 18 out of your way while operating the household appliance 20.

It should be understood, of course, that the foregoing relates to exemplary embodiments of the invention and that modifications may be made without departing from the spirit and scope of the invention as set forth in the following claims.

What is claimed is:

1. A power cord holder comprising:
   a hollow outer tube including a top end and a bottom end;
   a suction cup mounted to the top end of the hollow outer tube, wherein the first suction cup is configured to be adhered to a ceiling;
   an inner tube arranged and configured to slide in and out of the hollow outer tube, the inner tube including a free end protruding from the bottom end of the hollow outer tube;
   a rotatable mounting block attached to the free end of the inner tube;
   a bearing system that spins the rotatable mounting block to rotate relative to the inner tube; and
   hooks secured to the bearing system of the rotatable mounting block, and the hooks spin with the movement of the rotatable mounting block.

2. The power cord holder according to claim 1, further including:
   a plurality of pin holes along a length of the hollow outer tube, the plurality of pin holes each being located in opposed sides of the hollow outer tube; and
   at least one locking pin located on the inner tube, wherein the locking pin engages or disengages with any of the plurality of pin holes of the hollow outer tube to adjust the length of the power cord holder, wherein the at least one locking pin extends out of at least one of the plurality of pin holes when engaged therein.

3. The power cord holder according to claim 2, wherein the locking pin is a spring-loaded locking pin.

4. The power cord holder according to claim 1, wherein the power cord holder is an overhead holder.

5. The power cord holder according to claim 1, further including a second, smaller suction cup integrally molded to an interior of the first suction cup.

6. The power cord holder according to claim 1, wherein the hooks have an S-shape, a U-shape, a V-shape, or a J-shape.

7. The power cord holder according to claim 1, wherein the bearing system rotates the rotatable mounting block with the movement of a power cord such that the rotatable mounting block is rotatable with the inner tube.

8. A power cord holder comprising:
   a hollow outer tube including a top end and a bottom end;
   a suction cup mounted to the top end of the hollow outer tube;
   an inner tube arranged and configured to slide in and out of the hollow outer tube, the inner tube including a free end protruding from the bottom end of the hollow outer tube;
   a rotatable mounting block attached to the free end of the inner tube;
   a bearing system that spins the rotatable mounting block to rotate relative to the inner tube; and
   hooks secured to the rotatable mounting block that spin with the rotatable mounting block relative to the inner tube;
   wherein the inner tube is configured to telescope from the hollow outer tube.

9. The power cord holder according to claim 8, further comprising:
   a plurality of pin holes along a length of the hollow outer tube formed within the hollow outer tube, the plurality of pin holes each being located in opposed sides, and
   at least one locking pin located on the inner tube, wherein the locking pin engages or disengages with any of the plurality of pin holes of the hollow outer tube to adjust the length of the power cord holder, wherein the at least one locking pin extends out of at least one of the plurality of pin holes when engaged therein.

10. The power cord holder according to claim 8, further including a smaller suction cup integrally molded to an interior of the suction cup.

11. The power cord holder according to claim 8, wherein the bearing system rotates the rotatable mounting block with the movement of a power cord such that the rotatable mounting block rotates with regard to the inner tube.

12. The power cord holder according to claim 8, wherein while engaged position, the at least one locking pin locks the inner tube relative to the hollow outer tube, and while disengaged, the inner tube is free to move relative to the hollow outer tube.

13. The power cord holder of claim 8, wherein the suction cup is removably adhered to a ceiling surface a position of the power cord holder is adjusted relative to the ceiling surface and the power cord holder is re-adhered to the ceiling surface using the suction cup.

14. The power cord holder of claim 8, wherein the at least one locking pin is a spring-loaded locking pin.

15. The power cord holder of claim 14, wherein the spring-loaded locking pin is moved between multiple pin holes located along the hollow outer tube.

16. A method of using a power cord holder including a hollow outer tube and an inner tube, comprising:
   adhering the power cord holder to a ceiling surface using a suction cup mounted to a top end of the hollow outer tube;
   adjusting the height of the power cord holder by engaging at least one locking pin positioned on the inner tube of the power cord holder into pin holes of the hollow outer tube of the power cord holder;
   attaching a rotatable mounting block to a free end of the inner tube;

spinning the rotatable mounting block relative to the inner tube using a bearing system;

securing hooks to the bearing system of the rotatable mounting block such that the hooks spin with the movement of the rotatable mounting block;

wrapping a power cord on the hooks; and sliding the inner tube relative to the hollow outer tube so that the inner tube extends from the hollow outer tube to raise and lower the power cord.

* * * * *